United States Patent
Gäfvert

(10) Patent No.: US 7,989,019 B2
(45) Date of Patent: Aug. 2, 2011

(54) METHOD AND APPARATUS FOR ADMINISTERING PASSIVATOR TO A CONDUCTOR

(75) Inventor: Uno Gäfvert, Västerås (SE)

(73) Assignee: ABB Technology Ltd., Zürich (CH)

( * ) Notice: Subject to any disclaimer, the term of this patent is extended or adjusted under 35 U.S.C. 154(b) by 895 days.

(21) Appl. No.: 11/579,182

(22) PCT Filed: May 2, 2005

(86) PCT No.: PCT/IB2005/002355
§ 371 (c)(1), (2), (4) Date: Dec. 18, 2007

(87) PCT Pub. No.: WO2005/117031
PCT Pub. Date: Dec. 8, 2005

(65) Prior Publication Data
US 2008/0135277 A1 Jun. 12, 2008

Related U.S. Application Data

(60) Provisional application No. 60/566,606, filed on Apr. 30, 2004.

(51) Int. Cl.
- *B05D 1/00* (2006.01)
- *B05D 1/02* (2006.01)
- *B05D 1/30* (2006.01)
- *B05D 5/00* (2006.01)
- *B05D 5/12* (2006.01)

(52) U.S. Cl. ........ 427/117; 427/121; 427/435; 427/439; 427/442

(58) Field of Classification Search .................... 336/173
See application file for complete search history.

(56) References Cited

U.S. PATENT DOCUMENTS

| | | | | |
|---|---|---|---|---|
| 2,566,195 | A * | 8/1951 | Hardy et al. | 252/572 |
| 4,313,836 | A * | 2/1982 | Nassry et al. | 508/276 |
| 4,415,629 | A * | 11/1983 | Palumbo et al. | 428/375 |
| 4,450,424 | A * | 5/1984 | Sadler et al. | 336/94 |
| 4,624,884 | A * | 11/1986 | Harada et al. | 428/218 |
| 5,949,017 | A * | 9/1999 | Oommen et al. | 174/17 LF |
| 6,488,038 | B1 | 12/2002 | Bergman et al. | |
| 7,026,438 | B2 * | 4/2006 | Camenzind et al. | 528/360 |

FOREIGN PATENT DOCUMENTS

| WO | WO-00/11121 A | 3/2000 |
|---|---|---|
| WO | WO-03/004476 A | 1/2003 |

OTHER PUBLICATIONS

PCT/ISA/210—International Search Report—Nov. 28, 2005.

* cited by examiner

*Primary Examiner* — Jerry Lorengo
*Assistant Examiner* — Jared Wood
(74) *Attorney, Agent, or Firm* — Venable LLP; Eric J. Franklin

(57) ABSTRACT

A method for administering passivator to a conductor in a power transformer, comprising providing a reservoir of the passivator, wherein the reservoir is provided by adding the passivator to solid insulation prior to impregnating the solid insulation with oil, and wherein the passivator is added to the solid insulation as the solid insulation is applied to a conductor.

18 Claims, 2 Drawing Sheets

METHOD AND APPARATUS FOR ADMINISTERING PASSIVATOR TO A CONDUCTOR

FIELD OF THE INVENTION

The present invention relates to a method and apparatus for administering passivator to a conductor in a power transformer.

SUMMARY OF THE INVENTION

A method for administering passivator to a conductor in a power transformer. A reservoir of the passivator is provided.

A structure for administering passivator to a conductor in a power transformer. The structure includes a conductor immersed in the oil. Insulation is arranged about the conductor. A reservoir including the passivator is immersed in the oil.

Further objectives and advantages, as well as the structure and function of exemplary embodiments will become apparent from a consideration of the description, drawings, and examples.

BRIEF DESCRIPTION OF THE DRAWINGS

The foregoing and other features and advantages of the invention will be apparent from the following, more particular description of an exemplary embodiment of the invention, as illustrated in the accompanying drawings wherein like reference numbers generally indicate identical, functionally similar, and/or structurally similar elements.

DETAILED DESCRIPTION OF EMBODIMENTS OF THE INVENTION

Figure 1:
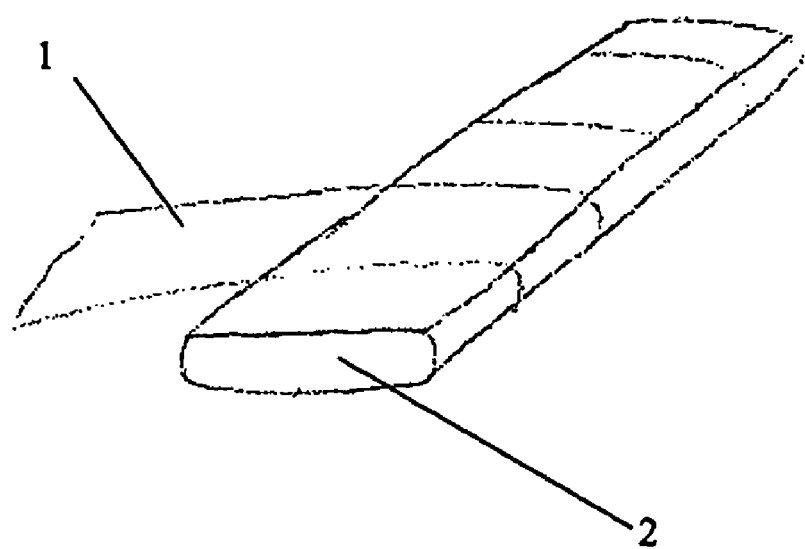
FIG. 1 represents an illustration showing a perspective view of an embodiment of a structure according to the present invention.

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention.

In power transformers, copper passivator is usually added to the oil. However, the passivator is typically adsorbed by copper surfaces, making the passivator less accessible for reactions with aggressive oil components. As a consequence, less copper is dissolved by the oil.

Some passivator also typically remains in solution in the oil, forming stable complexes with dissolved copper. This results in deactivating the dissolved copper and decreasing its catalytic effect on the oxidation of oil. However, the passivator is slowly consumed.

The present invention provides solutions to reduced passivator in the oil. Along these lines, the present invention provides both methods and structures for providing additive to oil, and in particular, passivator. Rather than simply adding passivator to the oil, a reservoir of passivator is provided. The reservoir may take a variety of forms. Typically, the reservoir includes passivator provided on another structure, such as insulation or a conductor. The reservoir may also or alternatively include a separate structure in and/or on which the passivator is provided. Providing a passivator in a manner according to the present invention can provide a better long-term effect as compared to known techniques for providing passivator to a power transformer. Also, where no additives are added to insulating oil, the present invention permits passivator and possibly other additives without infringing on such requirements. It follows that additives other than passivators may be introduced into power transformers or other equipment utilizing the methods and structures according to the present invention.

Embodiments of the present invention can permit passivator to be provided at locations where it may be most needed. For example, the passivator may be applied on the surface of a conductor and/or on insulation on the conductor. It is also not necessary that the passivator be easily soluble in the oil. Providing passivator as according to the present invention may also make a transformer system less sensitive for a particular oil utilized. For example, the transformer may be less sensitive in the sense that even if the oil contains some corrosive (sulfur) components the well passivated conductor will not be attacked. Furthermore, the present invention provides a cheaper solution than providing passivator in a lacquer or paint. For example, the present invention provides a cheaper solution than any enameled conductor.

A reservoir or depot of the passivator is included in the power transformer. The reservoir or depot may be provided in a number of different ways. For example, the passivator may be applied to the conductor, the insulation, or other surfaces in the power transformer. The passivator may alternatively or additionally be applied integrated into the insulation or another structure in the power transformer. Along these lines, an additional structure could be added to the transformer to act as a depot or reservoir.

Some embodiments of the present invention where the passivator(s) is applied to the conductor may considered "surface passivation". Such embodiments can includes application of passivator(s) to or near the surface of the conductor. The passivator(s) may be applied by dripping, spraying, and/or or painting on the conductor. The passivator(s) could be mixed with one or more other substances and/or solvents. The passivator(s) could be added to a covering paper that is wound to the conductor. Alternatively, the passivator substance(s) may be applied to an inner layer of a covering paper that is wound to the conductor. According to one embodiment, the passivator(s) can be drip-fed on a copper conductor as the conductor enters the paper winding process. A method and arrangement may be utilized to achieving a high concentration of passivator substance near the surface of the conductor.

Passivators that may be utilized according to the present invention can include passivators with high solubility and/or medium to low solubility in oil. Examples of passivators that are soluble in oil include N,N-bis(2-etylhexyl)-((1,2,4-triazoles-1-yl)methyl)amin) or benzotriazole type (e.g. N,N-bis (2-etylhexyl)-4-methyl-1H-bensotriazole-1-methylamin.

Examples of passivators with moderate to low solubility in oil include triazoles and benzotriazoles. The triazoles and benzotriazoles may have no substituents at all. Alternatively, the triazoles and benzotriazoles may have short hydrocarbon chain substituents, such as having from one to ten carbon atoms. Copper containing passivators may also be utilized. Other passivators may also be utilized and those skilled in the art would be able to determine the correct passivator(s) to utilize without undue experimentation.

As described above, the reservoir or depot of passivator(s) may be provided on the conductor. Alternatively or additionally, passivator(s) may be applied to insulation on the conductor and/or another structure immersed in the oil. For example, the passivator(s) may be applied to solid insulation, such as paper insulation, that is applied to the conductor. The passivator(s) may be applied as the insulation is manufactured and/or as the insulation is applied to the conductor. For example, the insulation may be impregnated with the passivator(s). The passivator(s) may also be sprayed on the insulation. According to one embodiment, the passivator(s) is applied to paper insulation at the paper mill where the paper is produced, before the paper is spooled into rolls. If the passivator(s) is applied by spraying, it may be applied with an atomizer or any other spraying means.

The passivator(s) reservoir or depot may also or alternatively be provided on a structure separate from the conductor and the insulation. For example, the separate structure could be cellulose. The separate structure could be impregnated with passivator(s) or the passivator applied to one or more surfaces of the structure. The structure may then be arranged in the oil. According to one embodiment, the separate structure includes a mesh-walled cartridge placed in the main tank or a column-type cartridge in the cooling loop. One advantage of including the passivator(s) in a separate structure is a reduction or elimination in the risk of loss of the active substance in the processing of the active part. Including the passivator(s) in a separate structure also permits the separate structure to be replaced. The separate structure may be surrounded by a protective, segregating structure, which may be porous.

Figure 2:
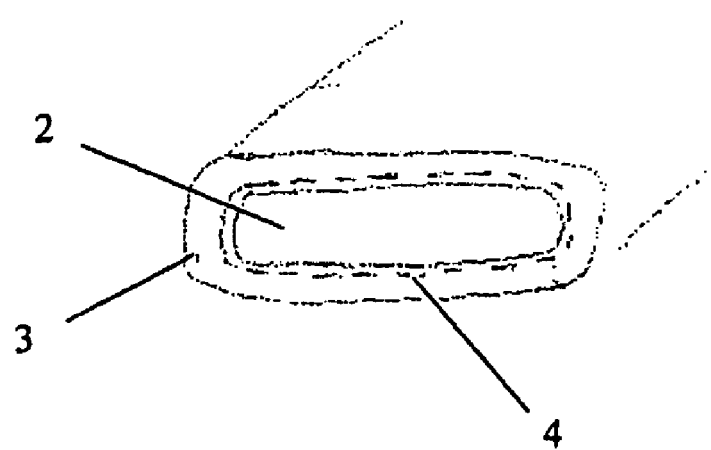
FIG. 2 represents an illustration showing a cross-section view of the embodiment shown in FIG. 1.

FIG. 1 illustrates a perspective view of an embodiment of a structure according to the present invention. In the embodiment shown in FIG. 1, a paper tape 1 impregnated with the passiviator(s) is wrapped around the conductor 2. FIG. 2 illustrates a cross-sectional view of the embodiment shown in FIG. 1. The rest of the insulation 3 may be wrapped about the conductor and paper tape. The rest of the insulation may or may not include passivator. The region 4 has a high concentration of passivator adjacent to the surface of the conductor.

Figure 3:
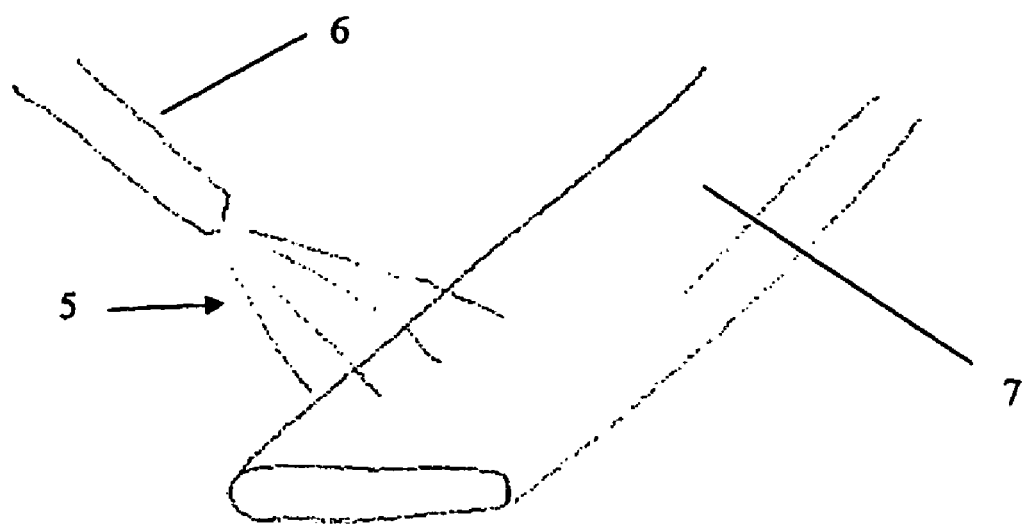
FIG. 3 represents an illustration showing a perspective view of an embodiment of a process according to the present invention for spraying passivator or a solution containing passivator on a conductor.

FIG. 3 illustrates a perspective view of an embodiment of a process according to the present invention that includes spraying passivator or a solution containing passivator on a conductor. In this embodiment, a spray 5 of passivator or solution is formed by a nozzle 6, which directs the spray on the conductor 7. The passivator or solution can be applied to the conductor through spraying, painting, dripping, passing the conductor through a bath, or any other method.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

I claim:

1. A method for administering passivator to a conductor in a power transformer, the method comprising:
   providing a reservoir of the passivator, wherein the reservoir is provided by adding the passivator to solid insulation prior to impregnating the solid insulation with oil, and wherein the passivator is added to the solid insulation as the solid insulation is applied to a conductor.

2. The method according to claim 1, wherein the reservoir is included with an insulating structure that is to be immersed in oil.

3. The method according to claim 1, wherein the reservoir is provided by applying the passivator to at least one surface of a conducting structure and a covering paper applied to the conductor over the passivator.

4. The method according to claim 3, wherein the passivator is drip fed on the conductor.

5. The method according to claim 1, wherein the reservoir is provided by spraying the passivator on solid insulation.

6. The method according to claim 5, wherein the insulation comprises paper and the passivator is applied with an atomizer on a side of the paper.

7. The method according to claim 1, wherein the reservoir comprises material impregnated with the passivator.

8. The method according to claim 7, wherein the reservoir comprises cellulose.

9. The method according to claim 7, further comprising:
   arranging the reservoir in a segregating structure in the vessel containing the oil.

10. The method according to claim 9, wherein the segregating structure is porous.

11. The method according to claim 1, wherein the passivator comprises a metal passivator.

12. The method according to claim 11, wherein the passivator includes at least one of N,N-bis(2-ethylhexy)-((1,2,4-triazole-1-yl)methyl)amine and N,N-bis(2-ethylhexyl)-4-methyl-1H-benzotriazole-1-methylamine.

13. The method according to claim 1, wherein the passivator comprises a copper-containing passivator.

14. The method according to claim 1, wherein the passivator is soluble in oil.

15. The method according to claim 1, wherein the passivator has moderate to low solubility in oil.

16. The method according to claim 15, wherein the passivator includes at least one of triazoles and benzotriazoles.

17. The method according to claim 16, wherein the triazoles and benzotriazoles have no substituents.

18. The method according to claim 16, wherein the triazoles and benzotriazoles have short hydrocarbon chain substituents including from 1 to 10 carbon atoms.

* * * * *